(12) United States Patent
Tsuji

(10) Patent No.: US 7,417,685 B2
(45) Date of Patent: Aug. 26, 2008

(54) CRADLE APPARATUS FOR DIGITAL CAMERA

(75) Inventor: Shigekazu Tsuji, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 627 days.

(21) Appl. No.: 10/256,013

(22) Filed: Sep. 27, 2002

(65) Prior Publication Data

US 2003/0063215 A1 Apr. 3, 2003

(30) Foreign Application Priority Data

Sep. 27, 2001 (JP) ............................. 2001-295940

(51) Int. Cl.
*H04N 5/225* (2006.01)

(52) U.S. Cl. .................... 348/375; 348/207.1; 348/372; 348/373

(58) Field of Classification Search ............. 348/207.1, 348/207.11, 207.99, 211.2, 211.4, 211.99, 348/372, 373, 375, 376; 396/301; 455/556.1, 455/556.2

See application file for complete search history.

(56) References Cited

U.S. PATENT DOCUMENTS 6,121,998 A * 9/2000 Voois et al. ............... 348/14.13
6,195,511 B1 * 2/2001 Harada ........................ 396/300
6,833,867 B1 * 12/2004 Anderson ................. 348/231.9
7,126,629 B1 * 10/2006 Braunstein et al. ........ 348/207.1
2002/0101534 A1 * 8/2002 Liu ............................. 348/375
2002/0145403 A1 * 10/2002 Wang et al. .................. 320/107
2003/0011702 A1 * 1/2003 Ohmura et al. ............. 348/372
2004/0201774 A1 * 10/2004 Gennetten ................... 348/375

FOREIGN PATENT DOCUMENTS

JP 2000-232599 8/2000

* cited by examiner

Primary Examiner—John M. Villecco
Assistant Examiner—Daniel M Pasiewicz
(74) Attorney, Agent, or Firm—Oblon, Spivak, McClelland, Maier & Neustadt, P.C.

(57) ABSTRACT

A cradle apparatus for a digital camera with a control program preliminarily installed, including a communicating device in which an information signal is sent and received between an information processing apparatus and the digital camera, an output by which video signal is output, a connector onto which the digital camera is detachably connected, a charging detector to detect a voltage level of battery in the digital camera, and a version detector to detect the control program for the digital camera being sent and received as the information signal between the digital camera and the information processing apparatus by the communicating device to re-write the control program.

7 Claims, 11 Drawing Sheets

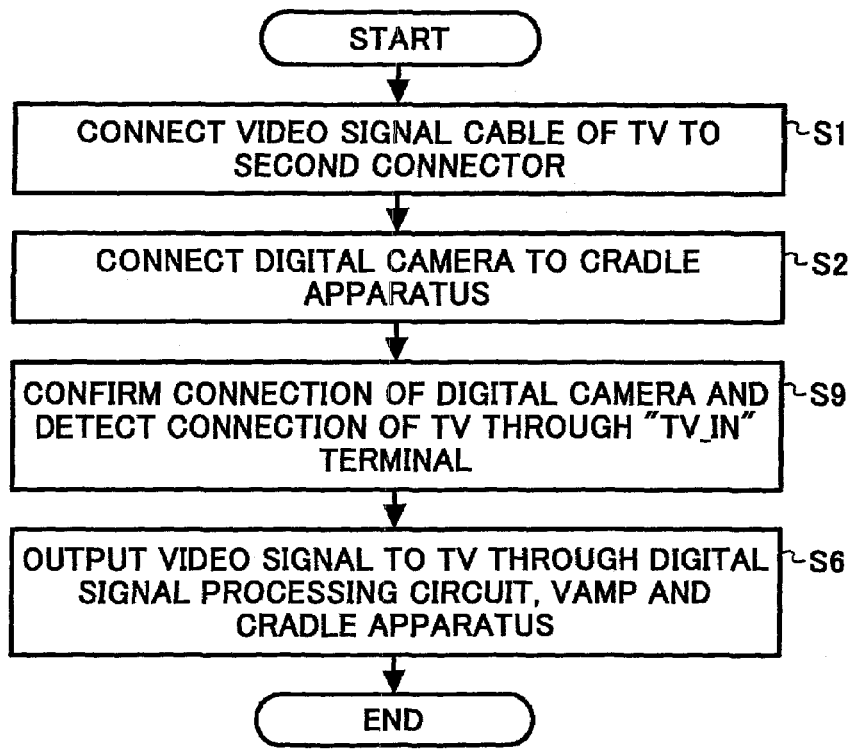
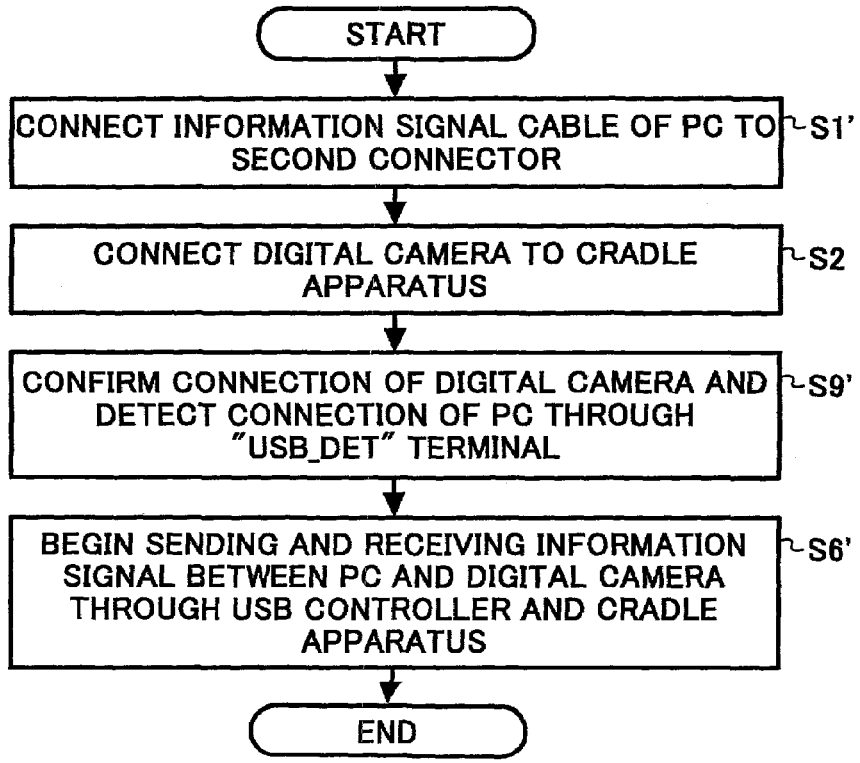

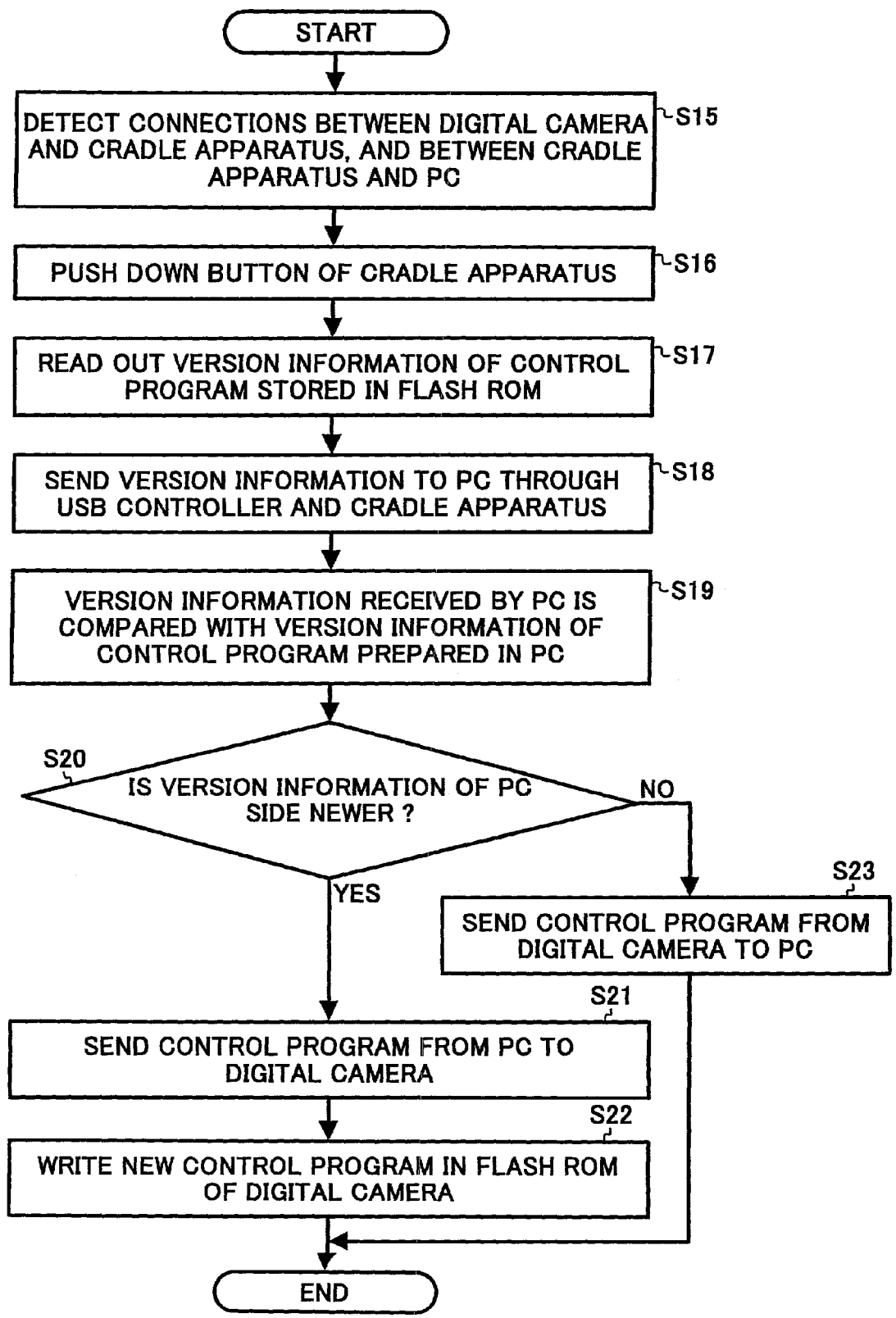

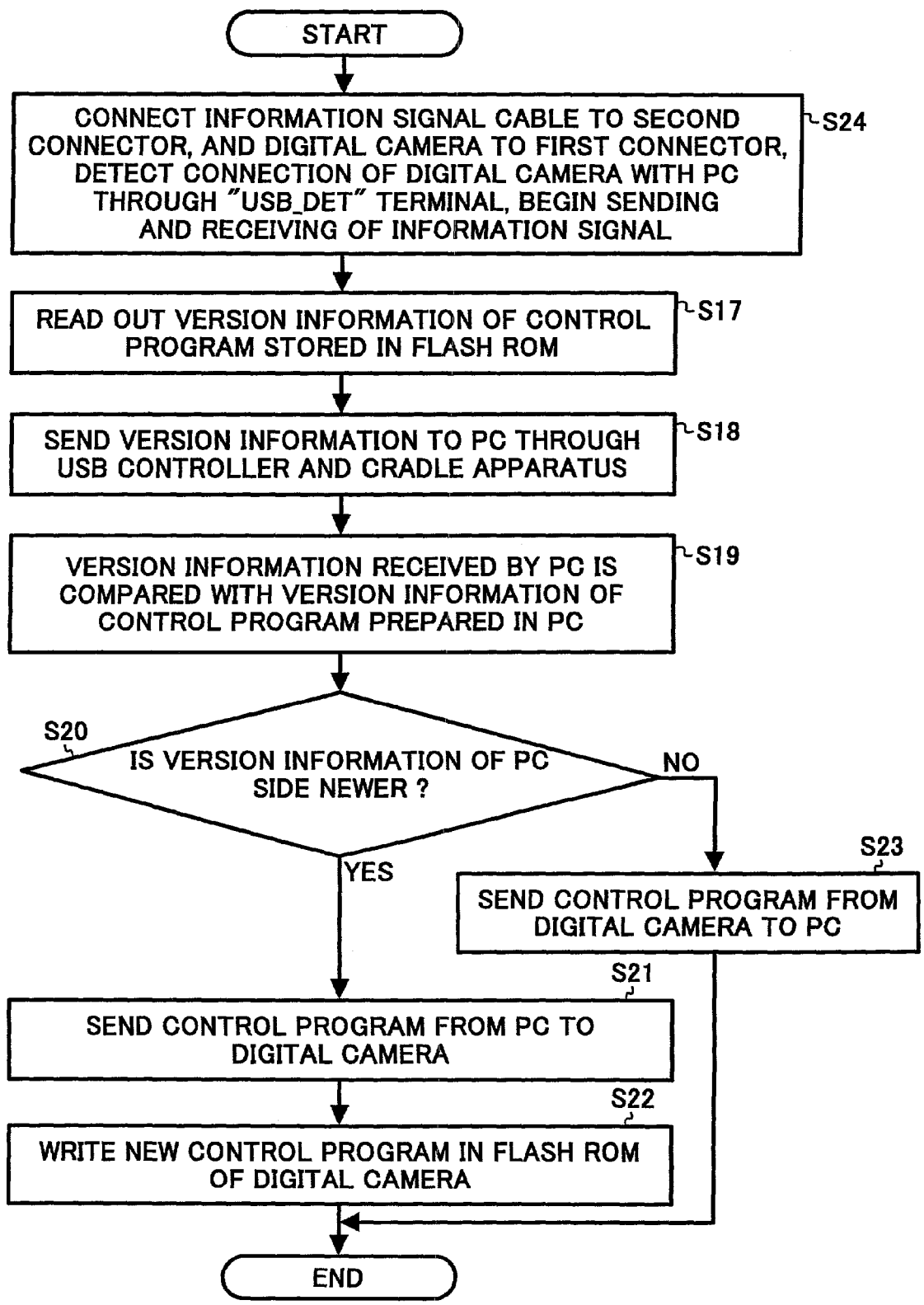

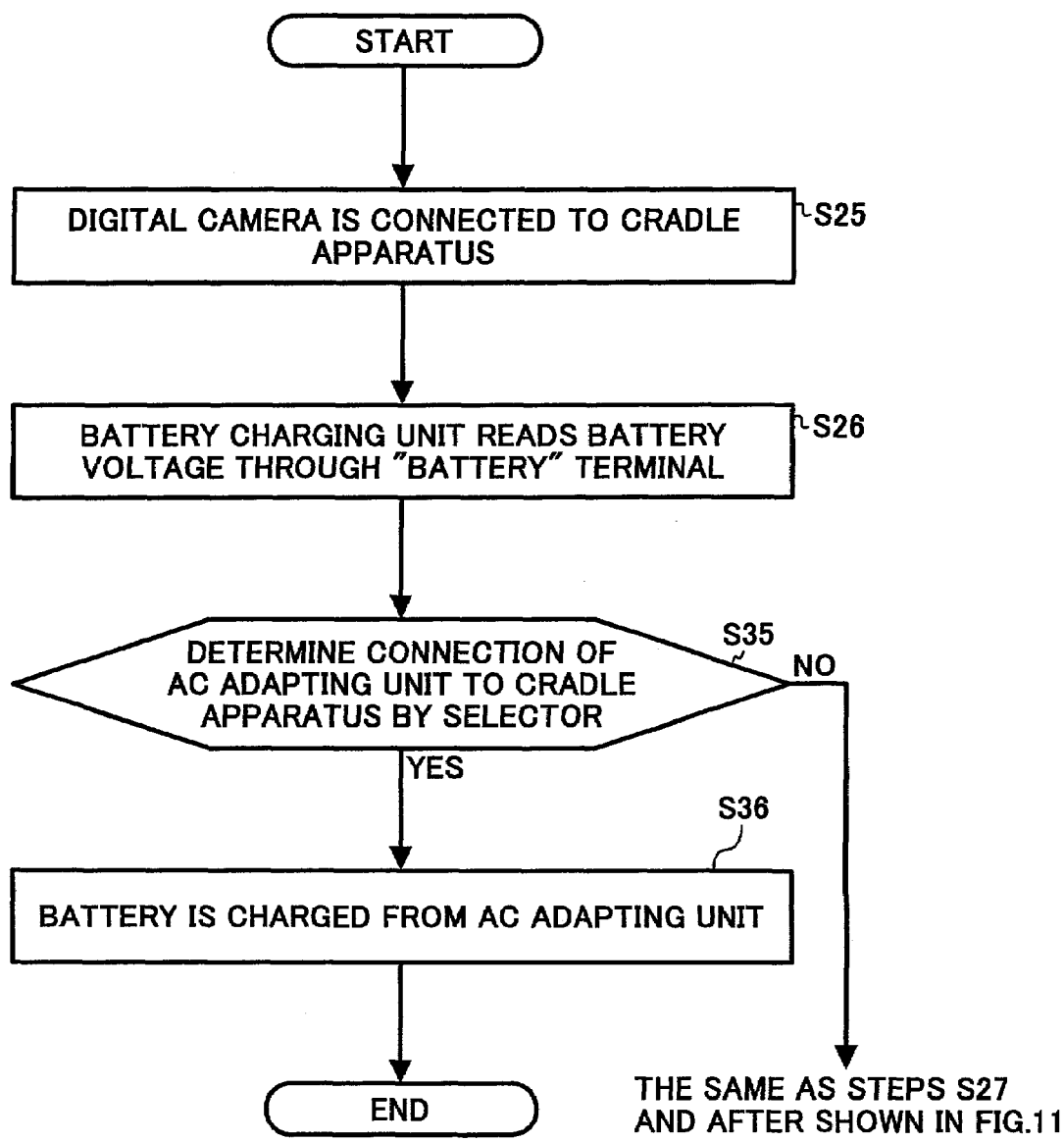

CRADLE APPARATUS FOR DIGITAL CAMERA

BACKGROUND OF THE INVENTION

1. Field of the Invention

The present invention relates to a cradle apparatus for a digital camera by which a battery charging of the digital camera and for sending and receiving a signal between an external equipment and the cradle apparatus.

2. Description of the Prior Art

A conventional cradle apparatus technology has been adapted to attain an object to transfer image data photographed by a digital camera from the digital camera through a destination computer system or a network to an oriented server apparatus. In a description of Japanese Patent Publication No. 2000-232699 titled "Digital Camera, Operating Method, computer readable recording medium, computer system, automated system and digital photograph", an image detecting unit by which an image is received and image data representing the image are output, a memory unit by which the image data are stored, and input-output adapter which is made operable to detect a connection to a network, to settle a connection for communication with a destination system, and to transfer the stored image data to the destination system, are included in a digital camera, on the other hand a connection to external power source and a connection for communication are carried out by a cradle apparatus assembly.

The cradle apparatus with this kind of structure can, however, supply the operating power source of the digital camera and at the same time can transfer the image data which are photographed and sent to the destination computer, but there are problems that the cradle apparatus can not perform a battery charging of battery in the digital camera and the cradle apparatus can not deal with video signal output from the digital camera.

SUMMARY OF THE INVENTION

The present invention is made to solve the aforementioned problems around the prior art, and it is an object of the present invention to provide a cradle apparatus for digital camera by which the battery charging of battery in the digital camera and output of video signal from the digital camera are both made possible as well.

At the same time, an external equipment connected by an interposition of one connector onto which several different external equipments can be connected, is automatically detected, and in compliance with a result of this detection the output of video signal from the digital camera or a sending and receiving of the information signal in order to re-write a control program for the digital camera is made possible.

To attain the aforementioned object of the present invention, a first aspect of the present invention provides a cradle apparatus for a digital camera, including a communicating means in which information signal is sent and received between an information processing apparatus and the communicating means, and an outputting means by which video signal is output, the digital camera having: a connecting means detachably connected; a charging detecting means to detect a voltage level of a battery in the digital camera; and a battery charging means for charging the battery when the battery in the digital camera which is connected to the connecting means is detected that the battery is not in a full charged state by the charging detecting means. By this arrangement it can perform a battery charging depending on a status of the battery.

In accordance with a second aspect or a third aspect of the present invention, the cradle apparatus can be adapted to start the battery charging depending on a status of the battery by means of putting the digital camera on the cradle apparatus.

The invention according to a fourth aspect provides a cradle apparatus used for a digital camera having a communicating means by which information signal is sent and received with information processing apparatus, and an outputting means by which video signal is output, including: a first connecting means onto which the digital camera is detachably connected; a second connecting means onto which a television monitor is connected; and a video signal output means which is arranged between the first connecting means and the second connecting means to output the video signal from the digital camera to the television monitor. By this arrangement the video signal from the digital camera is made possible to be displayed as image by a connection of television monitor to the cradle apparatus.

In accordance with a fifth aspect or a sixth aspect of the present invention, the output of video signal can be started only by connecting the digital camera to the cradle apparatus, the output process of video signal can be started by a direction from user and at the same time it can be noticed that the output process is in progress.

In accordance with a seventh aspect or a eighth aspect of the present invention even within the battery charging operation a command for processing from a user can be acceptable and convenience of cradle apparatus is improved.

The invention according to a ninth aspect provides a cradle apparatus for a digital camera including a communicating means by which information signal is sent and received between an information processing apparatus and the communicating means, and an outputting means by which video signal is output, the digital camera having: a first connecting means detachably connected; a third connecting means onto which a television monitor or the information processing apparatus is selectively connected; a video signal output means which is arranged between the first connecting means and the third connecting means to output the video signal from the digital camera to the television monitor; and an information signal sending and receiving means which is arranged between the first connecting means and the third connecting means to send and receive the information signal between the digital camera and the information processing apparatus.

By this arrangement in the cradle apparatus one connecting means is made integrated to be selectively connected with two different external equipments, then the cradle apparatus can be made downsizing.

In accordance with a tenth aspect of the present invention output of video signal and sending and receiving of information signal can be begun by the connection of digital camera onto the cradle apparatus.

In accordance with a eleventh aspect of the present invention the external equipment which is connected to the third connecting means, can be determined.

In accordance with a twelfth aspect or a thirteenth aspect of the present invention the output process of video signal or sending and receiving process of information signal can be begun by a direction from user and at the same time it can be noticed that the process is in progress, then the convenience of cradle apparatus is improved.

In accordance with in any one of a fourteenth aspect to sixteenth aspect of the present invention the battery charging can be performed by electric power supplied from the information processing apparatus through the third connecting means when the electric power can not be supplied from the commercial electric power source.

In accordance with a seventeenth aspect of the present invention even within the battery charging operation a command for processing from a user can be acceptable and convenience of cradle apparatus is improved.

In accordance with eighteenth aspect of the present invention an improvement of maintenance for digital camera can be realized.

BRIEF DESCRIPTION OF THE DRAWINGS

Hereinafter, the preferred embodiments according to the present invention will be described in detail with reference to the attached drawings;

FIG. 1 is a diagram to show an appearance of cradle apparatus for digital camera in accordance with one embodiment of the present invention, in which

FIG. 7 is a flow chart to show the output operation of video signal from the digital camera to the television apparatus in accordance with another example of embodiment.

FIG. 8 is a flow chart to show a sending and receiving operation of information signal between the digital camera and an information processing apparatus.

FIG. 9 is a flow chart to show a modifying operation of control program for the digital camera through the cradle apparatus.

FIG. 10 is a flow chart to show a modifying operation of control program for the digital camera through the cradle apparatus in accordance with another example of embodiment.

FIG. 12 is a flow chart to show a switching operation between power supplies for the battery charging operation in the cradle apparatus.

DETAILED DESCRIPTION OF PREFERRED EMBODIMENTS

Figure 1A:
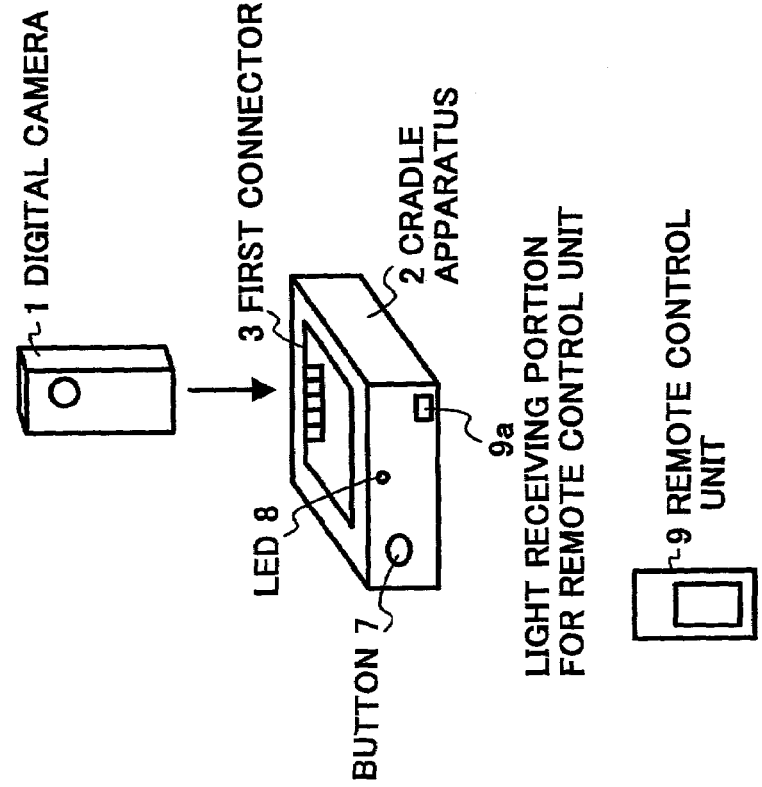
FIG. 1A is a perspective view when it is seen from its front side.
Figure 1B:
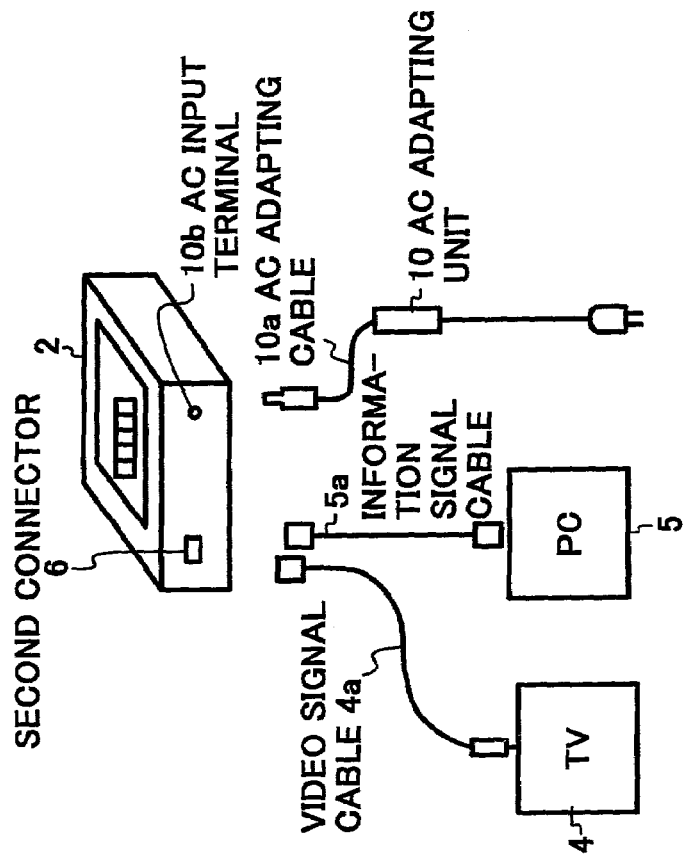
FIG. 1B is a perspective view when it is seen from its back side.

As shown in FIGS. 1A and 1B, a cradle apparatus 2 includes a first connector 3 (connecting means, first connecting means) to which a digital camera 1 is connected, and a second connector 6 (second connecting means, third connecting means) to which a television apparatus (hereinafter referred to as "TV") 4 and a information processing apparatus (hereinafter referred to as "PC") 5 are connected. For connection with the TV 4 and PC 5 the second connector 6 is shared to use, and to be more precise a video signal cable 4a is connected to the second connector 6 when it is connected with the TV 4, and an information signal cable (USB cable) 5a is connected to the second connector 6 when it is connected with the PC 5.

The cradle apparatus 2 also includes a button 7 (activating means), LED 8 (notifying means), a light receiving portion 9a for a remote control unit 9 (hereinafter referred to as "remote controller") and an AC input terminal 11b for commercial electric power source (hereinafter referred to as "AC"). To the AC input terminal 10b an AC adapting unit 10 in connected through an adapting cable 10a. The electric power source is supplied to the cradle apparatus 2 after it is converted from AC to DC by the AC adapting unit 10.

Figure 2:
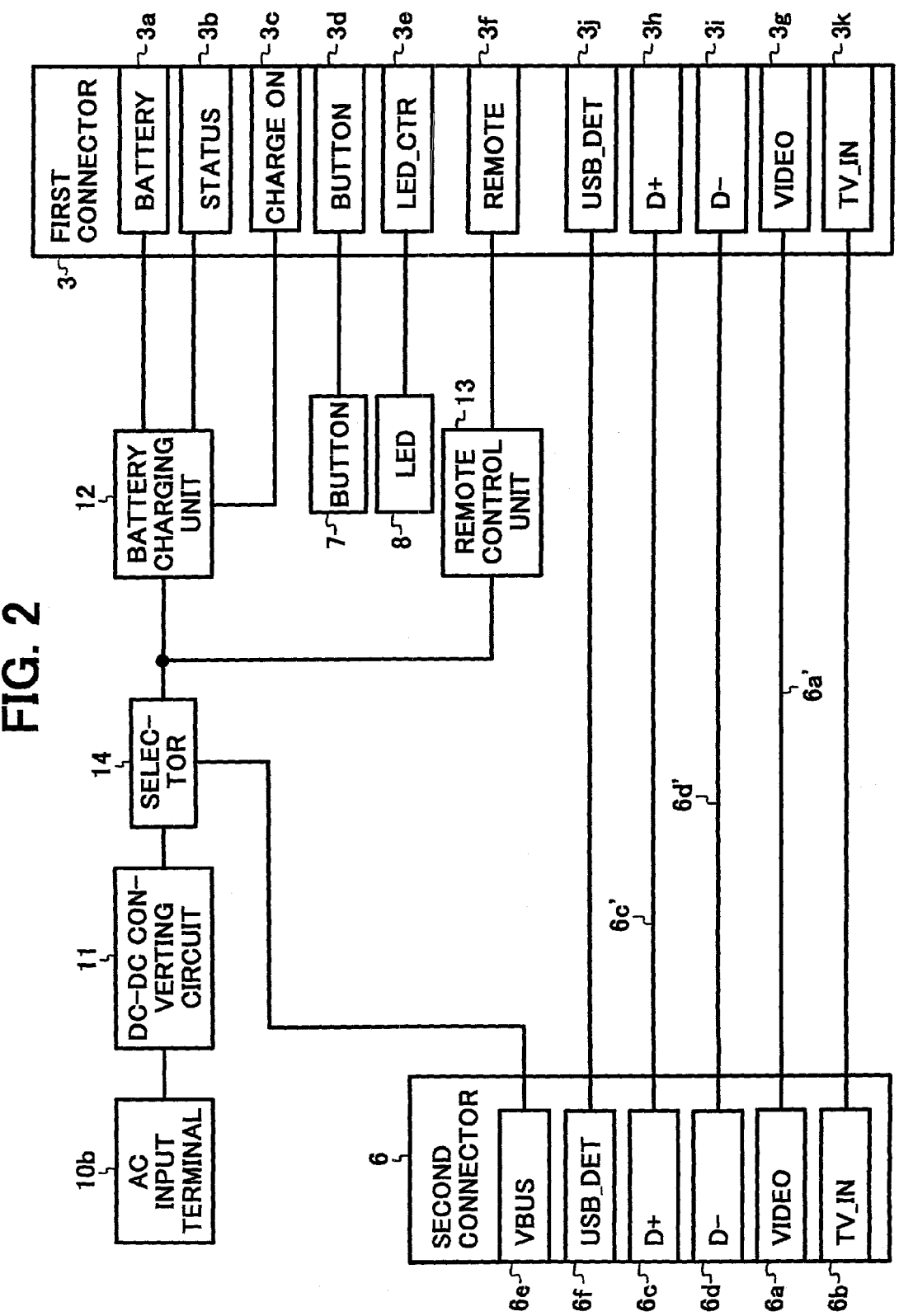
FIG. 2 is a block diagram to show an interior structure of the cradle apparatus shown in FIG. 1.

In FIG. 2, a DC power source supplied from the AC adapting unit 10 is supplied to a battery charging unit 12 (charging detecting means, battery charging means) and a remote controlling unit 13 through a DC-DC converting circuit 11.

A "Battery" terminal 3a of the first connector 3 is arranged to be used for the battery charging unit 12 to detect a level of voltage of a battery 28 (see FIG. 3) for the digital camera 1 which is connected to the first connector 3 and for the battery charging unit 12 to perform the battery charging for the digital camera 1. A "Status" terminal 3b (connection detecting means) is arranged to be used for the battery charging unit 12 to supply to the digital camera 1 the information related to a state of the battery charging for the battery 28, and used for the digital camera 1 to detect a connection with the cradle apparatus 2. A "Charging on" terminal 3c is arranged to be used for the digital camera 1 to output a start command for charging to the battery charging unit 12 of cradle apparatus 2.

In the cradle apparatus 2 are arranged a "VIDEO" terminal 6a to output the video signal from the digital camera 1 to the TV 4, and a "D+" terminal 6c and a "D−" terminal 6d to perform information signal sending and receiving between the digital camera 1 and the PC 5, not as individual connectors but as an integrated connector in the second connector 6.

When in a case the TV 4 is connected onto the second connector 6, a "VIDEO" terminal 3g of the first connector 3, and the "VIDEO" terminal 6a and a "TV_IN" terminal 6b (determining means) of the second connector 6 are used. The cradle apparatus 2 transfers the video signal which is output from the digital camera 1 connecting onto the first connector 3, to the TV 4 connecting onto the second connector 6 through a line 6a' (video signal output means) which connects between the "VIDEO" terminal 3g and the "VIDEO" terminal 6a. Because the second connector 6 is made capable to be connected with any of the video signal cable 4a of TV 4 and the information signal cable 5a of PC 5, the "TV_IN" terminal 6b is made to achieve an object for the digital camera 1 to determine which cable is connected to the second connecter 6.

In addition, when in a case the PC 5 is connected onto the second connector 6, a "D+" terminal 3h and a "D−" terminal 3i of the first connector 3, and a "D+" terminal 6c and a "D−" terminal 6d, a "Vbus" terminal 6e and a "USB_DET" terminal 6f (determining means) of the second connector 6 are used. A line 6e' (information sending and receiving means) which connects the "D+" terminal 3h and the "D+" terminal 6c, and a line 6d' (information sending and receiving means) which connects the "D−" terminal 3i and a "D−" terminal 6d, are made to relay the information signal between the PC 5 which is connected onto the second connector 6 and a USB controller 27 (See FIG. 3) of the digital camera 1 which is connected 6 onto the first connector 3. Because the second connector G is made capable to be connected with any of the video signal cable 4a of TV 4 and the information signal cable 5a of PC 5 as well, the "USB_DET" terminal 6f is made to achieve an object for the digital camera 1 to determine which cable is connected to the second connecter 6 the same as the "TV_IN" terminal 6b.

Further the "Vbus" terminal 6e is a terminal to which a +5V voltage is applied from the PC 5 through the information signal cable 5a. When the AC adapting unit 10 is not connected onto the AC input terminal 10b, the cradle apparatus 2 can perform battery charging for a battery of the digital camera 1 utilizing the voltage which is supplied through the information signal cable 5a.

The button 7 which is arranged on the cradle apparatus 2, is made to request to the digital camera a starting of the video signal output, a starting of the sending and receiving of information signal with the PC 5 and so on. When the button 7 is pushed down, the trigger information is transferred to the digital camera 1 through a "Button" terminal 3d of the first connector 3. The LED 8 which is arranged on the cradle apparatus 2 is made to be lighted up when the video signal output from the digital camera 1 is started, when the information signal communication with the PC 5 is started and so on. The cradle apparatus 2 receives a lighting command for the LED 8 from the digital camera 1 through a "LED_CTR" terminal 3e of the first connector 3. Herein, the remote control unit 13 of cradle apparatus 2 is connected with the light receiving portion 9a for a remote control unit 9, when the remote controlling signal output from the remote control unit 9 is received at the light receiving portion 9a, the information from the remote controller is transferred to the digital camera 1 through a "Remote" terminal 3f of the first connector 3 by the remote control unit 9.

Figure 3:
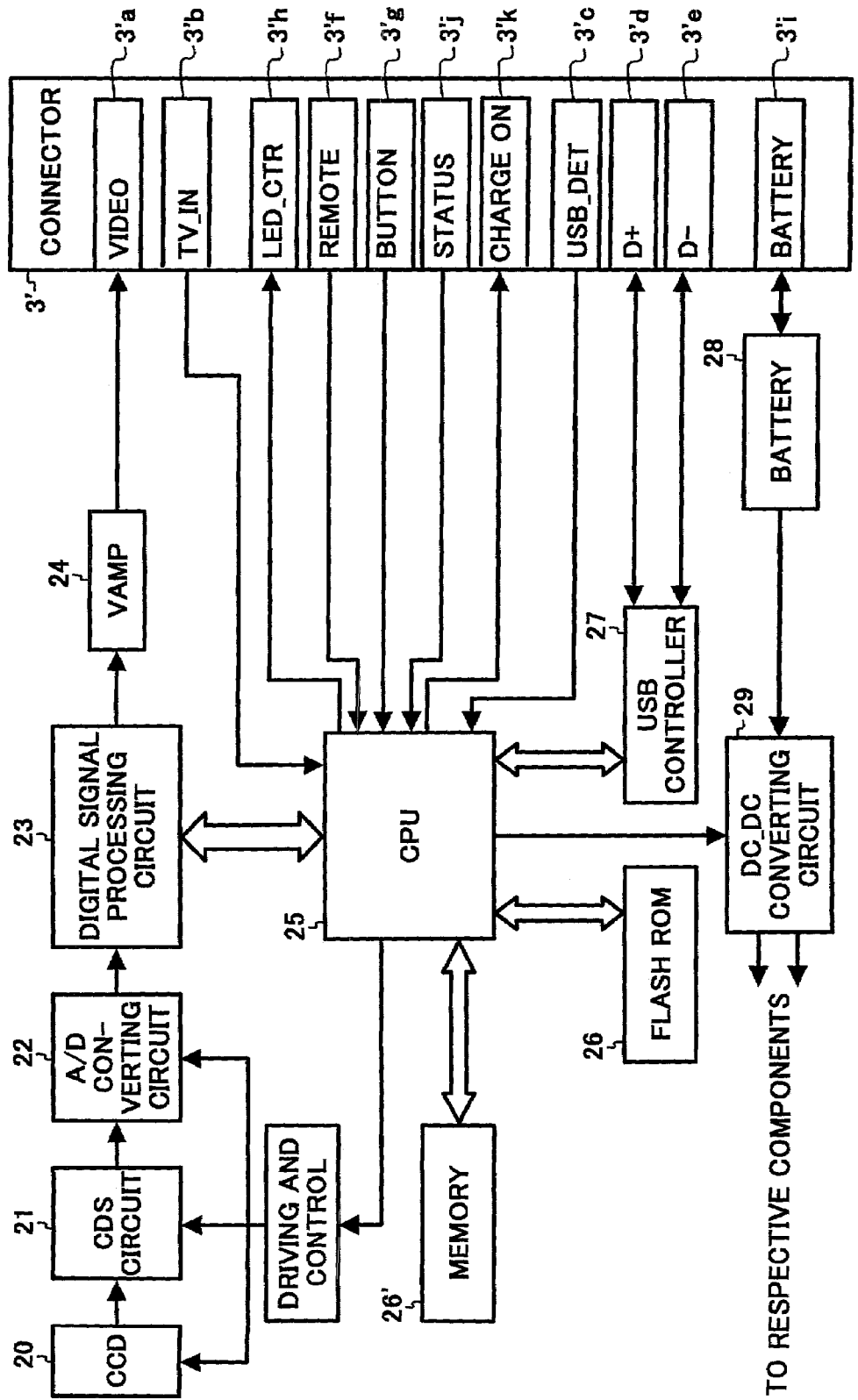
FIG. 3 is a block diagram to show an interior structure of a digital camera to be connected with the cradle apparatus shown in FIG. 1.

FIG. 3 is a block diagram to show an interior structure of the digital camera which is connected onto the cradle apparatus 2. An optical image to be photographed is received a CCD 20 of the digital camera 1 and converted into the electrical signal as the image data. The electrical signal which is output from the CCD 20 through a CDS (correlated double sampling) circuit 21 is converted into digital form by an A/D converting circuit 22 with the most adequate sampling frequency (for example, an integral multiple of the sub-carrier frequency of NTSC signal). On the digital form signal which is output from this A/D converting circuit 22, a camera signal processing such as a gamma correction process, a color separating process and so on are achieved, then Y (Luminance) signal and Cb_Cr (color difference) signal are generated. These signals are encoded in a image compression circuit then they are stored in a memory 26' which is made detachable from a body of the digital camera 1.

The signal which was performed the above described camera signal processing is output as a video signal in compliance with the NTSC system by the digital signal processing circuit 23. This video signal is output through a VAMP (Video Amp) 24 and to the "VIDEO" terminal 3'a then to the cradle apparatus 2 which is connected to the connector 3'.

CPU 25 of the digital camera 1 controls whole internal operations of the digital camera 1 on a basis of programs which are stored in a flash ROM 26. The programs stored in the flash ROM 26 are re-written. The PC 5 which is connected to the cradle apparatus 2, is made to perform reading out of data stored in memory 26' by means of the USB controller 27 through the cradle apparatus 2, and made to perform writing data into the memory 26'.

A "TV_IN" terminal 3'b and a "USB_DET" terminal 3'c of the connector 3' are arranged to determine whether the apparatus connected to the cradle apparatus 2 is the TV 4 or the PC 5. The CPU 25 determines which apparatus is connected based on the terminals of "TV_IN" terminal 3'b and a "USB_DET" terminal 3'c, and switches to output the video signal through the "Video" terminal 3'a of connector 3, or to transfer the information signal through the "D+" terminal 3'd and the "D−" terminal 3'e of connector 3' in relation to result of the determination.

The digital camera 1 received the remote control signal which is received by the remote control unit 13 of cradle apparatus 2 through a "Remote" terminal 3'f of the connector 3', and is operated in compliance with the remote control signal (for example, to process such as photographing and the like). A "Button" terminal 3'g of the connector 3' is arranged to detect if the button 7 of cradle apparatus 2 is pushed down or not, and a "LED_CTR" terminal 3'h of the connector 3' is arranged to light on the LED 8 of cradle apparatus 2.

Electric power for the digital camera 1 is supplied to a DC-DC converting circuit 29 from buttery 28 made of such as NiCd, Ni-Hydrogen, Lithium battery and so on, and to be supplied to respective parts arranged inside of the digital camera 1. At this point the electric power for the digital camera 1 is made possible also to be supplied through the cradle apparatus 2 other than the battery 28.

A "Battery" terminal 3'i of the connector 3' is arranged for the battery charging unit 12 of cradle apparatus 2 to detect a voltage level of the battery 28 of digital camera 1 which is connected to the first connector 3 and to perform battery charging for the battery 28. Also a "Status" terminal 3'j is made for the battery charging unit 28 to supply information related to charging status of the battery 28 to the digital camera 1, and to detect if the digital camera 1 is connected to the cradle apparatus 2 or not, and a "Charge On" terminal 3'k is arranged for the digital camera 1 to output a start command for the battery charging to the battery charging unit 12 of cradle apparatus 2.

Hereinafter operation of the embodiment of present invention will be described. When the digital camera 1 is connected to the first connector 3 of cradle apparatus 2, the digital camera 1 determines that it is connected to the cradle apparatus 2 through the "Status" terminal 3b and the "Status" terminal 3'j, in other words the cradle apparatus 2 is connected to the connector 3'. At this point it is also recommendable that the digital camera 1 may output a lighting on command for the LED 8 to the cradle apparatus 2 through the "LED_CTR" terminal 3e and the "LED_CTR" terminal 3'h, then the LED 8 is turned on and off in a predetermined interval in order to notice for users that the digital camera 1 is correctly connected to the cradle apparatus.

At this point when the digital camera 1 is connected to the first connector 3 of cradle apparatus 2, the battery charging unit 12 of cradle apparatus 2 detects a voltage level of the battery 28 of digital camera 1 through the "Battery" terminal 3a and the "Battery" terminal 3'i and at the same time notifies information related to the charging status of battery 28 to the digital camera 1 through the "Status" terminal 3b and the "Status" terminal 3'j. The digital camera 1 determines if the battery charging is necessary or not on a basis of this information related to the charging status of battery 28. When in a case it is determined that the battery charging is necessary, for example, by means of receiving an information that the battery 28 is not in a state with full charged and so on, the digital camera 1 outputs a starting command for the battery charging to the battery charging unit 12 through the "Charge On" terminal 3c and the "Charge On" terminal 3'k. The battery charging unit 12 which has received the starting command for battery charging, begins the battery charging operation for the battery 28 of digital camera 1 through the Battery" terminal 3a and the "Battery" terminal 3'i.

When the digital camera 1 is connected to the cradle apparatus 2 in a state that the digital camera 1 is under operation (for example, in operations such as monitoring, reproducing of image data and so on) and the battery charging will be determined necessary, it is also recommendable that the digital camera 1 outputs the starting command for battery charging to the battery charging unit 12 through the "Charge On" terminal 3c and the "Charge On" terminal 3'k and at the same time controls the DC-DC converting circuit 29 in order to stop the power supplying to respective parts arranged inside of the digital camera 1. In this case it may be recommendable that whole electric power for the digital camera 1 may be all shut down, or that a power system is switched that the power supplying from the battery 28 is changed to the power supplying through the cradle apparatus 2.

The digital camera 1 determines whether the external apparatus connected to the cradle apparatus 2 is the TV 4 or the PC 5 through the "TV_IN" terminal 3k and the "USB_DET" terminal 3j of the first connector 3, and the "TV_IN" terminal 6b and the "USB_DET" terminal 6f of the second connector 6.

When in a case that the TV 4 is connected to the cradle apparatus 2, the digital camera 1 outputs video signal of NTSC system to the TV 4 through a line 6a' ("VIDEO" terminal 3g of the first connector 3 and "VIDEO" terminal 6a of the second connector 6 of the cradle apparatus 2).

And when in a case that the PC 5 is connected to the cradle apparatus 2, the information signal is sent and received between the digital camera 1 and the PC 5 through a line 6c' ("D+" terminal 3h of the first connector 3 and "D+" terminal 6c of the second connector 6) of the cradle apparatus 2 and a line 6d' ("D−" terminal 3i of the first connector 3 and "D−" terminal 6d of the second connector 6) of the cradle apparatus 2.

Figure 4:
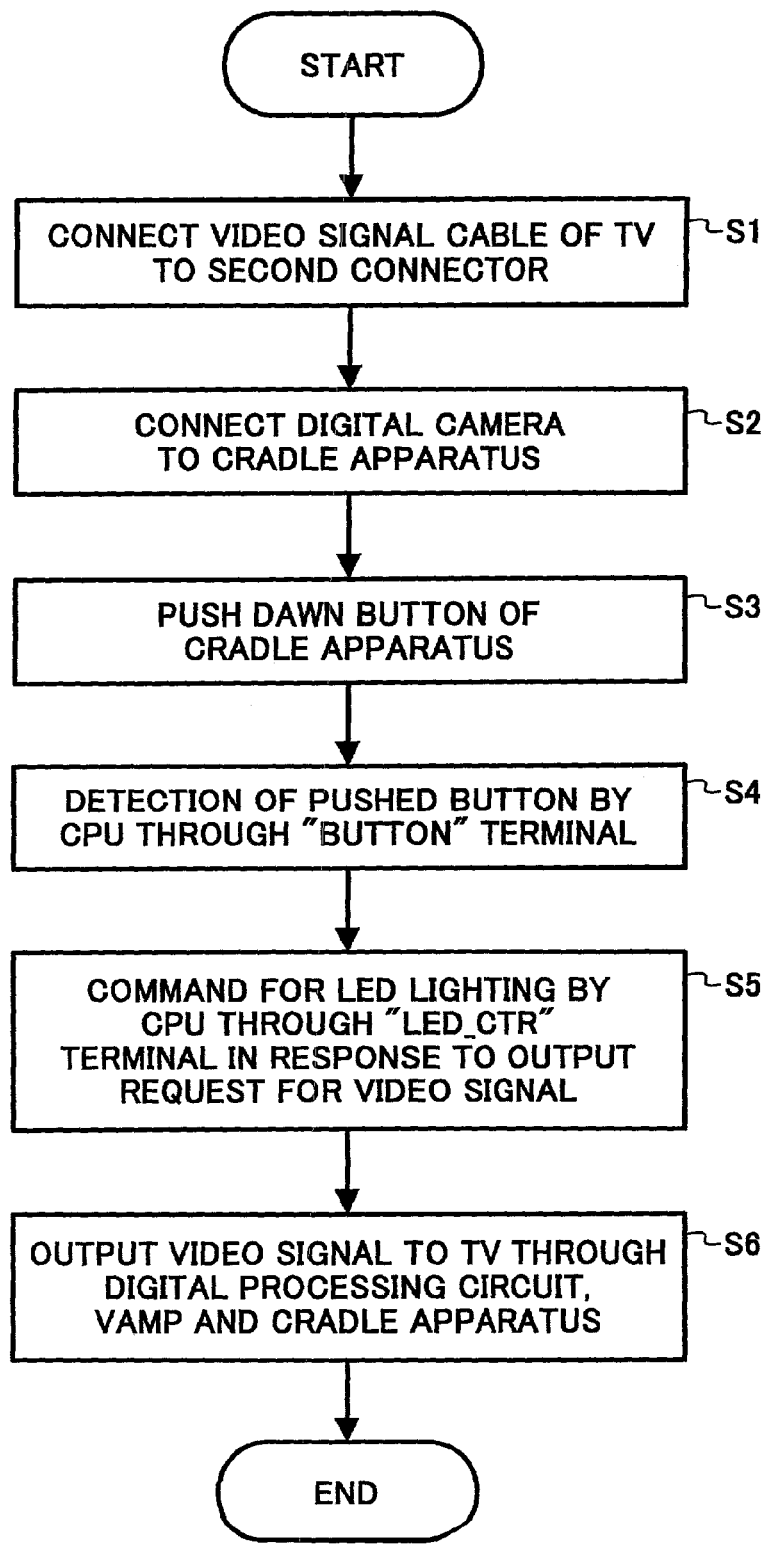
FIG. 4 is a flow chart to show an output operation of video signal from the digital camera to a television apparatus.

FIG. 4 is a flow chart to show an output operation of video signal from the digital camera 1 to the TV 4. A video signal cable 4a is connected to the second connecter 6 of cradle apparatus 2 (S1), and after the digital camera 1 is connected to the first connector 3 (S2), when the button 7 of cradle apparatus 2 is pushed down (S3), the CPU 25 of digital camera 1 detects a request command signal for video signal output through the "Button" terminal 3d and the "Button" terminal 3'g (S4). In compliance with the request command signal the CPU 25 gives an instruction for the LED 7 to be turned on to the cradle apparatus 2 through the "LED_CTR" terminal 3'h and the "LED_CTR" terminal 3e (S5), and at the same time the CPU 25 outputs the video signal of NTSC system to the TV 4 through the line 6a' ("VIDEO" terminal 3g and "VIDEO" terminal 6a) of cradle apparatus 2 (S6).

Figure 5:
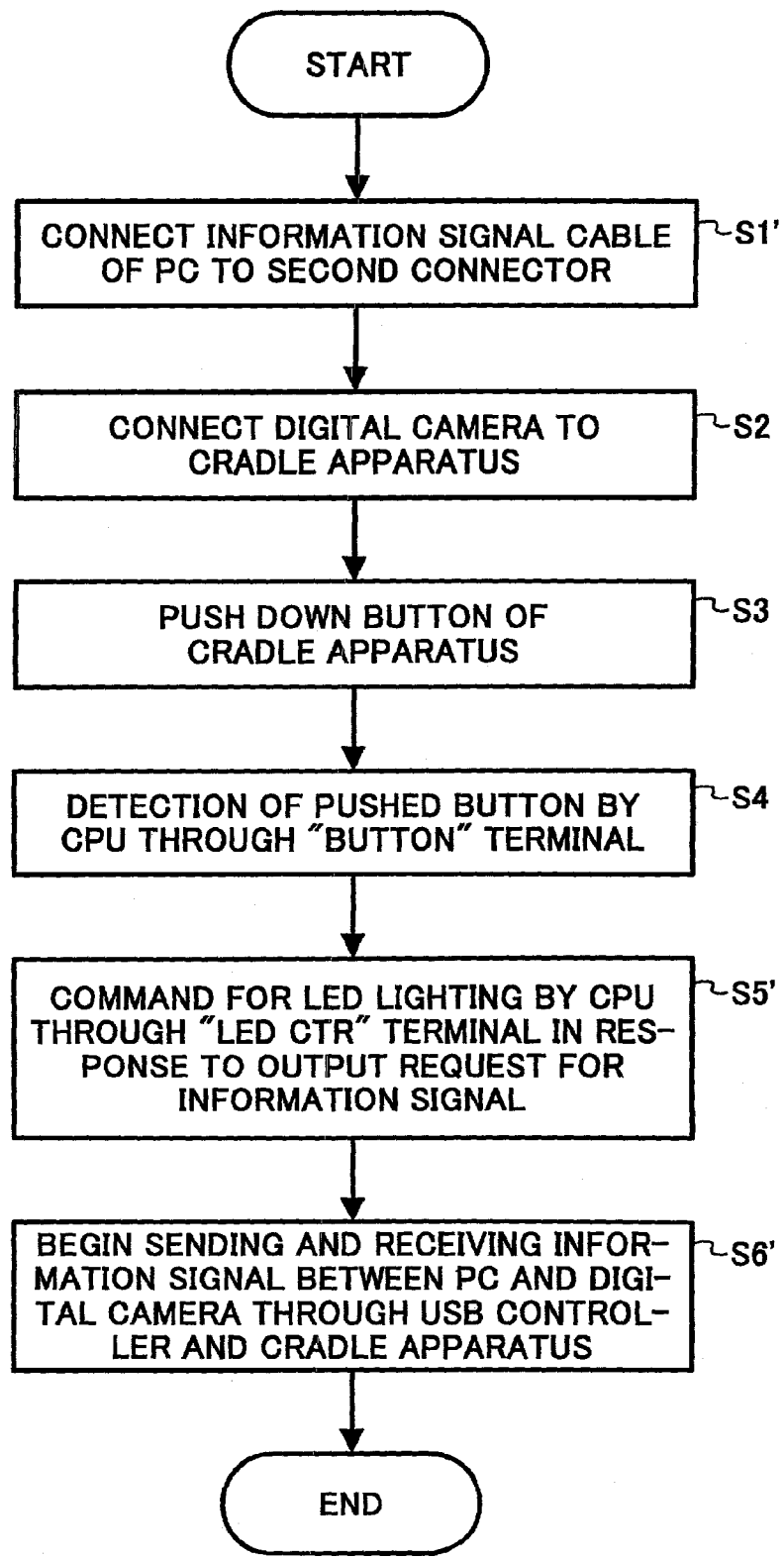
FIG. 5 is a flow chart to show a sending and receiving operation of information signal between the digital camera and an information processing apparatus.

FIG. 5 is a flow chart to show a sending and receiving operation of information signal between the digital camera 1 and the PC 5. The information signal cable 5a is connected to the second connector 6 of cradle apparatus 2 (S1') and after the digital camera 1 is connected to the first connector 3 (S2), when the button 7 of cradle apparatus 2 is pushed down (S3), the CPU 25 of digital camera 1 detects a request command signal for information signal output through the "Button" terminal 3d and the "Button" terminal 3'g (S4). In compliance with the request command signal the CPU 26 gives an instruction for the LED 7 to be turned on to the cradle apparatus 2 through the "LED_CTR" terminal 3'h and the "LED_CTR" terminal 3e (S5'), and at the same time the CPU 25 outputs the information signal from the USB controller 27 to the PC 5 through the line 6c' ("D+" terminal 3h and "D+" terminal 6c) and the line 6d' ("D−" terminal 3j and "D−" terminal 6d) of cradle apparatus 2, then begins to send and receive the information signal (S6').

Figure 6:
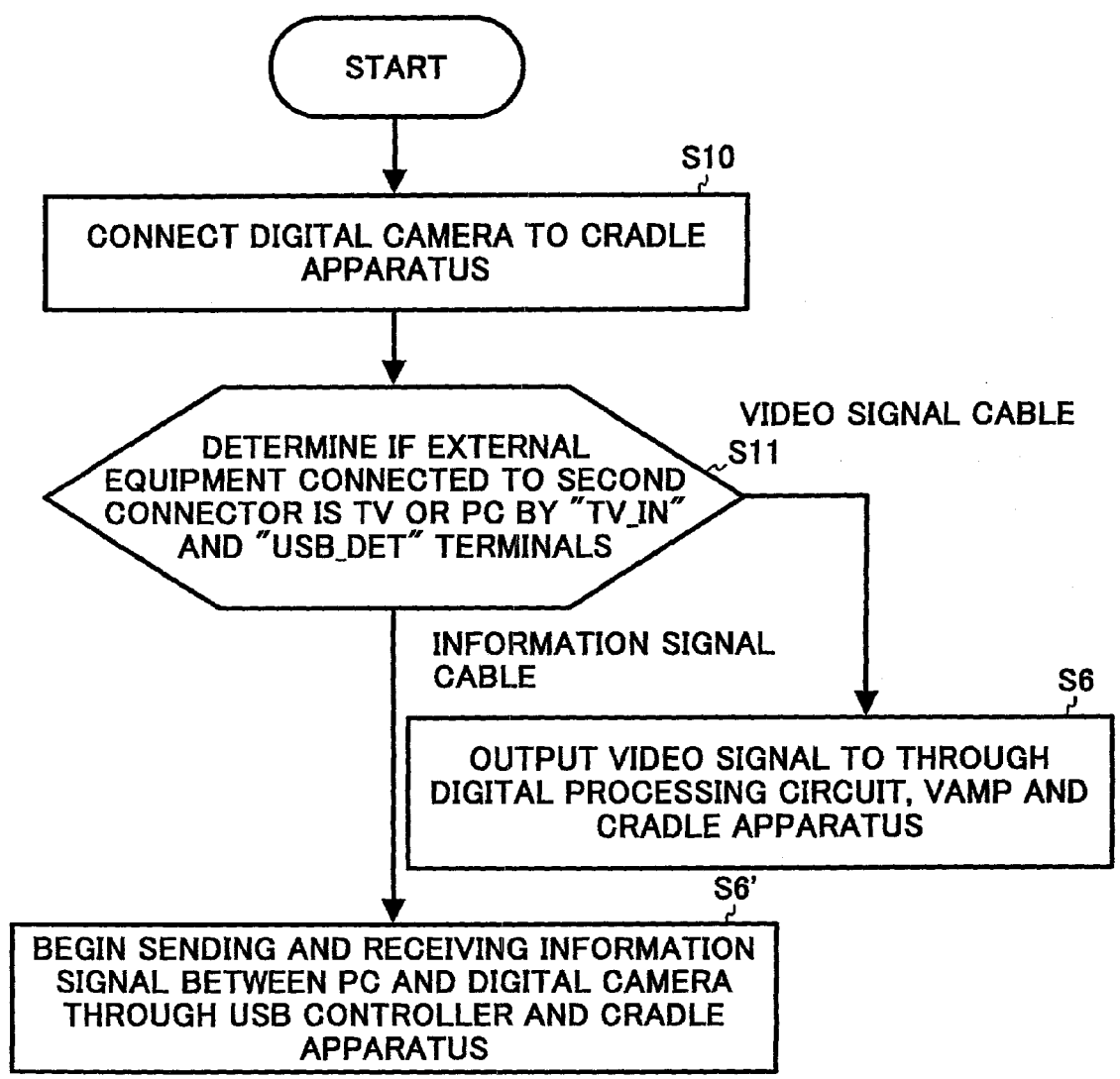
FIG. 6 is a flow chart to show a determining operation for connection with an external equipment with which a sending of the video signal and a sending and receiving of information signal are performed.

FIG. 6 is a flow chart to show a determining operation for connection with an external equipment with which a sending of the video signal and a sending and receiving of information signal are performed. When any one of the video signal cable 4a or the information signal cable 5a is connected to the second connector 6 of cradle apparatus 2 and the digital camera 1 is connected to the cradle apparatus 2 (S10), the CPU 25 of digital camera 1 performs the determination of external equipment connected to the second connector 6 through the "TV_IN" terminal 3k and the "TV_IN" terminal 6b when in a case the TV 4 is connected to the second connector 6, or through the "USB_DET" terminal 3j and the "USB_DET" terminal 6f when in a case the PC 5 is connected to the second connector 6, respectively (S11). Next, the CPU 25 performs the step S6 (FIG. 4) or the step S6' (FIG. 5) according to the result of determination in the step S11. In other words, when in a case the CPU 25 determines that the connected external equipment is the TV 4, the video signal is output to the TV 4, and when in a case the CPU 25 determines that the connected external equipment is the PC 6, the information signal is sent and received with the PC 5.

At this point, instead of process from step S3 to step S6 shown in FIG. 4 when TV 4 is connected to the cradle apparatus 2, it is also recommendable that after the CPU 25 detects the connection of digital camera to the cradle apparatus 2 and then the determination of external equipment is performed as the step S11 shown in FIG. 6, the video signal is output to the TV 4.

As shown in FIG. 7, when the video signal cable 4a is connected to the second connector 6 of cradle apparatus 2 (S1), and then the digital camera 1 is connected to the first connector 3 (S2), a connection of the digital camera 1 to the cradle apparatus 2 is confirmed through the "Status" terminal 3'd and the "Status" terminal 3b, further a connection of the cradle apparatus 2 to the TV 4 is confirmed through the "TV_IN" terminal 3k and the "TV_IN" terminal 6b (S9). Then the video signal of NTSC system is output to the TV 4 through the line 6a' ("VIDEO" terminal 3g and "VIDEO" terminal 6a) (S6).

At this point it is also recommendable that if there is a necessity of battery charging for battery 28 by the battery charging unit 12, is determined in step S2 after the digital camera 1 is connected to the cradle apparatus 2, and the battery charging process is performed in the first place when it is determined necessary. Also when in a case the video signal output process is performed antecedently to the battery charging process, the output process is achieved by the electrical power supplied through the cradle apparatus 2.

Further at this point instead of the processes of S3 to S5' shown in FIG. 5 when the PC 5 is connected to the cradle apparatus 2, it is also recommendable that the information signal may be send and received with the PC 5 after the connection of digital camera 1 to the cradle apparatus 2 is confirmed and then the determination of external equipment of step S11 shown in FIG. 6 is performed. The flow chart shown in FIG. 8 is almost the same as that of shown in FIG. 7, the differences are only points that the external equipment which is connected to is not the TV 4 but the PC 5 and the process to be performed is not output process of video signal but sending and receiving process of the information signal.

As shown in FIG. 8, when the information signal cable 5a is connected to the second connector 6 of the cradle apparatus 2 (S1'), and the digital camera 1 is connected to the first connector 3 (S2), a connection of the digital camera 1 to the cradle apparatus 2 is confirmed through the "Status" terminal 3'j and the "Status" terminal 3b, and then a connection of the PC 5 to the cradle apparatus 2 is detected through the "USB_DET" terminal 3j and the "USB_DET" terminal 6f (S9'). Then the information signal from the USB controller 27 is output to the PC 5 through the line 6c' of cradle apparatus 2("D+" terminal 3h and "D+" terminal 6c) and the line 6d' ("D–" terminal 3j and "D–" terminal 6d), the sending and receiving process of the information signal is begun (S6').

Next, FIG. 9 is a flow chart to show a modifying operation of control program for the digital camera 1 through the cradle apparatus 2. When the information signal cable 5a is connected to the second connector 6 of cradle apparatus 2, and the digital camera 1 is connected to the first connector 3 (S15), then the button 7 of cradle apparatus 2 is pushed down (S16), the CPU 25 of digital camera 1 begins to read out a version information of the control program which is stored in the flash ROM 26 (S17), and the information is sent to the PC 5 through the cradle apparatus 2 by the USB controller 27 (S18). The version information which is received by the PC 5, is compared with a version information of the control program prepared in the PC 5 (S19), the old and new of the version information which is received from the digital camera 1 are determined (S20). When in a case it is determined that the version information received from the digital camera 1 is older (when the result is "Yes" at step S20), the control program prepared in the PC 5 is sent from the PC 5 to the digital camera 1 (S21), a re-writing process of the flash ROM 27 in the digital camera 1 is performed (S22). On the other hand when in a case it is determined that the version information received from the digital camera 1 is newer (when the result is "No" at step S20), the control program stored in the flash ROM 26 of digital camera 1 is received and a re-writing process of control program stored in the PC 5 is performed (S23).

At this point it is also recommendable that the re-writing process of control program may be performed automatically by a detection which both the digital camera 1 and the PC 5 are connected to the cradle apparatus 2 instead of a pushing down of the button 7 in step S16.

As shown in FIG. 10, when a connection of the digital camera 1 to the cradle apparatus 2 is detected through the "Status" terminal 3'j and the "Status" terminal 3b, and a connection of the PC 5 to the cradle apparatus 2 is detected through the "USB_DET" 3j and the "USB_DET" 6f, respectively (S24), the version information of control program stored in the flash ROM 26 of digital camera 1 is read out by the CPU 25 in the digital camera 1 (S17), the version information is output to the PC 5 through the cradle apparatus 2 by the USB controller 27 (S18). The consecutive processes are quite the same as those of flow chart shown in FIG. 9 and further explanation will be omitted.

Figure 11:
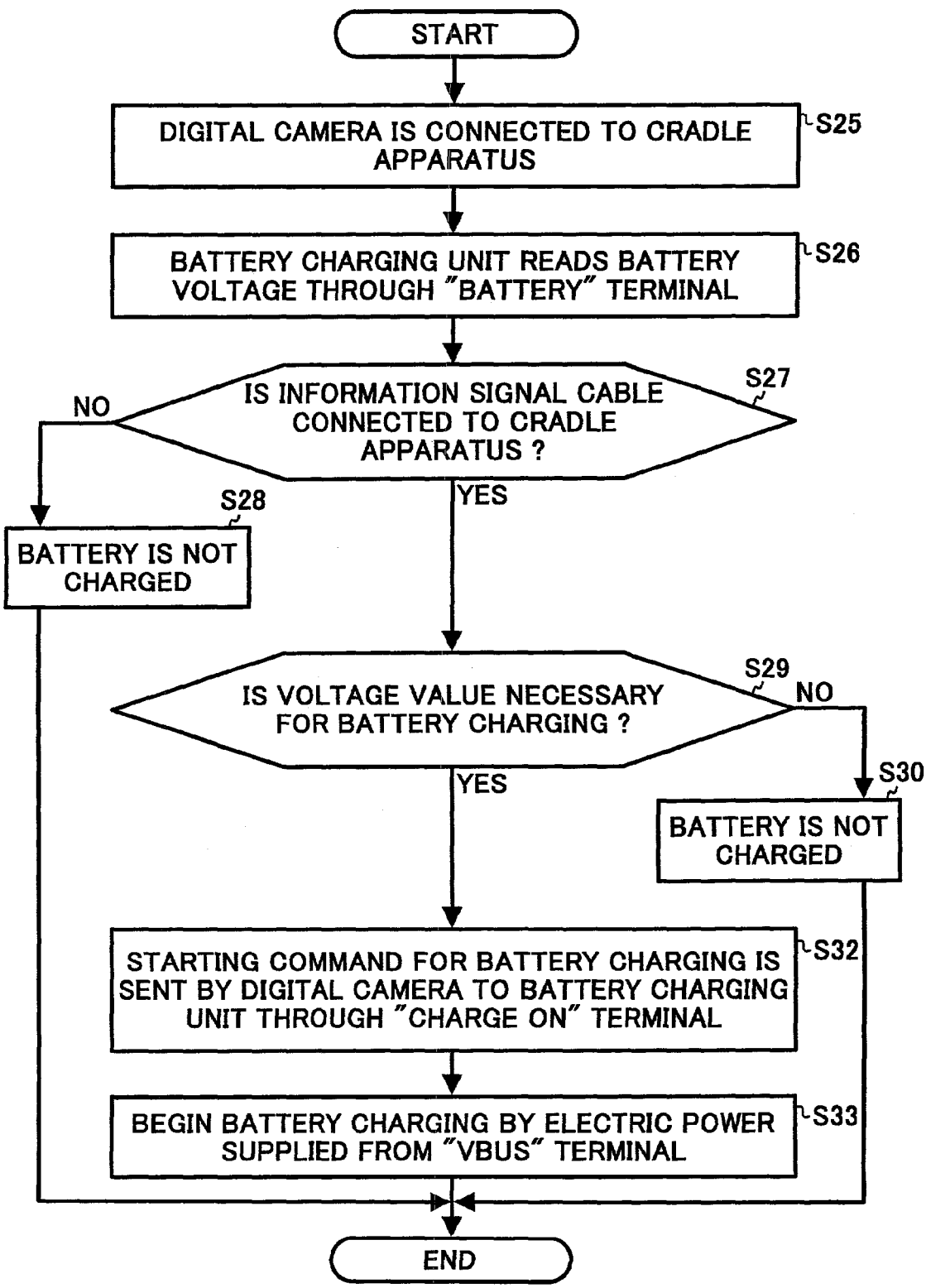
FIG. 11 is a flow chart to show a battery charging operation in which the power is supplied from the information processing apparatus.

FIG. 11 is a flow chart to show a battery charging operation in which the power is supplied from the PC 5. When in a case the information signal cable 5a is connected to the second connector 6 of the cradle apparatus 2 and the digital camera 1 is connected to the first connector 3, the battery 28 is charged with a +5V voltage which is supplied from the PC 5 through the information signal cable 5a and the "Vbus" terminal 6e of second connecter 6 of the cradle apparatus 2 to the digital camera 1.

When the digital camera 1 is connected to the cradle apparatus 2 (S25), a charging status of the battery 28 in the digital camera 1 is detected by the battery charging unit 12 in the cradle apparatus 2 through the "Battery" terminal 3a of first connector 3 and the "Battery" terminal 3'i of first connecter 3' (S26). Further if the cradle apparatus 2 and the PC 5 is connected through the information signal cable 5a or not is determined by the digital camera 1 (S27). When in a case it is determined that the PC 5 is not connected (in a case the result is "No" in step S27), the battery charging process through the information signal cable 5a is not performed (S28).

On the other hand when in a case it is determined that the PC 5 is connected (in a case the result is "Yes" in step (S27), a determination if the battery charging for battery 28 is necessary or not, is performed by the digital camera 1 on a basis of the information about the battery charging status, and when it is determined that it is not necessary to perform the battery charging (in a case the result is "No" in step S29), the battery charging process is not performed (S30).

On the other hand when in a case it is determined that it is necessary to perform the battery charging (in a case the result is "Yes" in step S29), a starting command for the battery charging process is sent to the battery charging unit 12 through the "Charge On" terminal 3'k and "Charge On" terminal 3c (S32). The electric power is supplied to the battery charging unit 12 through the "Vbus" terminal 6e of second connector 6, and the battery charging process for the battery 28 is begun through a selector 14 (switching means) (S33).

FIG. 12 is a flow chart to show a switching operation between power supplies for the battery charging process in the cradle apparatus. The switching operation between power supplies for battery charging process is performed on a basis of the determination if the AC adapting unit 10 is connected to the AC input terminal 10b in the cradle apparatus 2 or not. To be more precise it is arranged that the determination if the AC adapting unit 10 is connected to the AC input terminal 10b in the cradle apparatus 2 or not, is performed between the step S26 and the step S27 shown in the FIG. 11.

When the digital camera 1 is connected to the cradle apparatus 2 (S26), a battery charging status of the battery 28 in the digital camera 1 is confirmed by the battery charging unit 12 through the "Battery" terminal 3a and the "Battery" terminal 3'i (S26). Then a determination is performed if the AC input terminal 10b is connected to the AC adapting unit 10 and the electric power is supplied from the selector 14 or not (S35). In a case when a determination is performed that the AC power is supplied (when the result is "Yes" in step S35), the battery 28 is charged by means of electric power supplied from the AC adapting unit 10 (S36).

On the other hand when in a case a determination is performed that the AC power is not supplied (when the result is "No" in step S35), a determination is performed if the cradle apparatus 2 and the PC 5 are connected with the information signal cable 5a or not at step S27 shown in FIG. 11. The consecutive processes are quite the same as those of steps S27 to S33 shown in FIG. 11 and further explanation will be omitted.

By this arrangement, the battery 28 in the digital camera 1 can be charged even in a case there is no AC power source.

As above described in accordance with the present invention there is provided a cradle apparatus in which a battery charging process can be started in compliance with a battery charging status of the battery for digital camera, and a display operation for image on TV monitor can be performed on the basis of video signal output from the digital camera only by putting the digital camera on the cradle apparatus. Further there is provided a cradle apparatus in which by means of a determination of an external equipment that is connected to one connector onto which several different external equipment can be connected, and in response to the result of the determination, an outputting of a video signal or a sending and an outputting an information signal from the digital camera can be performed. At the same time there is provided a cradle apparatus in that a control program as an information signal for a digital camera is made to be re-written. Furthermore there is provided a cradle apparatus by which an effect is given that convenience for user is improved and a maintenance process of the digital camera is also improved by means of downsizing of the cradle apparatus.

What is claimed is:

1. A cradle apparatus for a digital camera, comprising:
a first connecting device onto which said digital camera is detachably connected said first connecting device including a connection detecting terminal for detecting whether said digital camera is connected to said first connecting device;
a second connecting device onto which an information processing apparatus for transferring information signals between said information processing apparatus and said digital camera, and a video signal outputting apparatus configured to output video signals from said digital camera, are selectively connected, said second connecting device including at least one connection detecting terminal for detecting whether said information processing apparatus or said video signal outputting apparatus is connected to said second connecting device;
a voltage detecting device for detecting a voltage level of a battery in the digital camera as a power supplying source in said digital camera;
a battery charging device configured to charge the battery when the voltage detecting device detects that the battery in said digital camera is not in a fully charged state while the digital camera is connected to the first connecting device, said battery charging device further configured to charge the battery via an AC input terminal and the second connecting device, the battery charging device further configured to charge the battery via only the AC input terminal when both the AC input terminal and second connecting device receive power;
an activating device configured to begin the process of said video signal outputting apparatus in response to operation of a user;
a notifying device configured to notify when the process of said video signal outputting apparatus is begun by said activating device; and
a version detecting device for detecting a first version and a second version newer than the first version of a control program preliminarily provided in said digital camera and said information processing apparatus,
wherein when the battery charging device is notified by said notifying device when the process by said video signal outputting apparatus is begun, said battery charging device stops charging said battery when process of said video outputting apparatus is begun while said battery charging device is in the battery charging operation, and
said version detecting device is configured to rewrite, upon actuation of a button, the first version of said control program via said information processing apparatus if the newer second version of said control program is detected in said information processing apparatus and rewrite said first version of said control program in said information processing apparatus via said digital camera if said newer second version of said control program is detected in said digital camera after said connection detecting terminal and said at least one connection detecting terminal detects that said digital camera and said information processing apparatus are connected to said first connecting device and said second connecting device, respectively.

2. The cradle apparatus according to claim 1, wherein said battery charging device begins to charge said battery after a power switch of said digital camera is turned off when said digital camera is detected to be connected to said cradle via said connection detecting terminal while said digital camera is in operating state and when said battery is detected not to be in the full-charge state by said voltage detecting device.

3. The cradle apparatus according to claim 1, wherein said video signals are outputted to said video signal outputting de*4ee apparatus when said digital camera is detected to be connected through said second connecting device to said video signal outputting device by said at least one connection detecting terminal.

4. The cradle apparatus according to claim 1, further comprising a remote control unit to remotely control output of said video signals to said video signal outputting apparatus from said digital camera or transmission of said information signals between said information processing apparatus and said digital camera.

5. The cradle apparatus according to claim 1, further comprising
a switching device for switching the power supplying source for said digital camera between said battery, said information processing apparatus which is connected to said cradle through said second connecting device, and a commercial electric power source.

6. The cradle apparatus according to claim 1, further comprising a switching device for switching the power supplying source for said digital camera from said battery to the power supplying source from said information processing apparatus which is connected to said cradle through said second connecting device when said battery is not in the full charge state and is being charged by said battery charging device.

7. The cradle apparatus according to claim 1, wherein said second connecting device is a USB cable.

* * * * *